United States Patent [19]

Nakayama et al.

[11] Patent Number: 4,780,354
[45] Date of Patent: Oct. 25, 1988

[54] MAGNETIC RECORDING MEDIUM

[75] Inventors: Masatoshi Nakayama; Kunihiro Ueda, both of Nagano, Japan

[73] Assignee: TDK Corporation, Tokyo, Japan

[21] Appl. No.: 10,990

[22] Filed: Feb. 5, 1987

[30] Foreign Application Priority Data

Feb. 5, 1986 [JP] Japan .................................. 61-23183

[51] Int. Cl.$^4$ ............................ G11B 5/70; G11B 5/64
[52] U.S. Cl. ..................................... 428/141; 427/41;
427/131; 428/336; 428/694; 428/695; 428/900
[58] Field of Search ................... 427/41, 131; 428/694,
428/695, 900, 336, 141

[56] References Cited

U.S. PATENT DOCUMENTS

| | | | |
|---|---|---|---|
| 3,219,353 | 11/1965 | Prentky | 360/131 |
| 4,429,024 | 6/1984 | Ueno et al. | 427/41 |
| 4,548,864 | 10/1985 | Nakayama et al. | 428/900 |
| 4,575,475 | 3/1986 | Nakayama et al. | 427/131 |
| 4,581,245 | 4/1986 | Nakamura et al. | 427/131 |
| 4,636,435 | 1/1987 | Yanagihara et al. | 427/41 |
| 4,645,703 | 2/1987 | Suzuki et al. | 428/141 |

FOREIGN PATENT DOCUMENTS

| | | |
|---|---|---|
| 51-129209 | 5/1975 | Japan . |
| 53-116115 | 3/1977 | Japan . |
| 5868227 | 10/1981 | Japan . |
| 58100221 | 12/1981 | Japan . |

Primary Examiner—Paul J. Thibodeau
Attorney, Agent, or Firm—Oblon, Fisher, Spivak, McClelland & Maier

[57] ABSTRACT

A magnetic recording medium comprising a substrate, a plasma polymerized film, and a magnetic layer is improved in physical and electromagnetic properties when the plasma polymerized film is comprised of carbon, or carbon and at least one optional element selected from hydrogen, nitrogen and oxygen.

11 Claims, 1 Drawing Sheet

FIG. 1

MAGNETIC RECORDING MEDIUM

CROSS REFERENCE TO RELATED APPLICATIONS

Reference is made to copending application Ser. No. 757,453 filed July 22, 1985 now abandoned; Ser. No. 758,433 filed July 24, 1985, now abandoned; Ser. No. 758,435 filed July 24, 1985, now abandoned; all directed to Magnetic Recording Medium and Recording/Reproducing Method Therefor and assigned to the same assignee as the present invention.

BACKGROUND OF THE INVENTION

Several decades have passed since the appearance of magnetic recording media comprising a nonmagnetic substrate and a magnetic layer primarily formed from a magnetic powder of oxide type such as gamma-$Fe_2O_3$ and cobalt-coated gamma-$Fe_2O_3$ and a binder. For the purpose of further improving recording density, magnetic recording media comprising a magnetic layer formed from a ferromagnetic powder such as Fe, Co, Ni, Fe-Co, Co-Ni, Fe-Co-Ni, Fe-Co-B, Fe-Co-Cr-B, Mn-Bi, Mn-Al, Fe-Co-V, etc. and a binder were recently developed and are now on commercial use.

Magnetic recording media of another type characterized by an increased recording density and a reduced thickness of the magnetic layer are those having vapor phase plated thin films such as vacuum deposited and sputtered metal thin films or liquid phase plated thin films such as electroless plated thin films. They are now on commercial use and of great interest in the art.

These magnetic recording media are required, particularly in their applications as magnetic tape and disk, to exhibit a low coefficient of friction, smooth and stable run, improved abrasion resistance, stable operation for an extended period of time, stable performance or reproduction in any ambient conditions to which they are exposed, durability, and scratch resistance.

A variety of pre-treatments were made on various substrates in order to improve the durability and scratch resistance of the resulting medium. The known pretreatments include treatments with chemical solution, coating, corona discharge treatment, and the like. Among them, the corona discharge treatment is not fully effective. Wet treatments like chemical solution treatment and coating are troublesome to carry out and require a considerable cost.

Under these circumstances, we proposed to treat a substrate with a plasma as disclosed in U.S. Pat. No. 4,575,475. The plasma treatment is a one-step dry process and thus has the advantage that drying and disposal of spent solution are unnecessary and no extra material like binder is consumed. In addition, the plasma treatment enables high speed, continuous production so that it can be readily incorporated in the process of manufacturing magnetic recording media without sacrificing production speed and yield. The plasma treatments are generally carried out using air, oxygen, nitrogen, hydrogen, helium, argon or the like as a treating gas. The plasma treatment of a substrate increases the adherence between the substrate and a subsequently applied magnetic layer, resulting in improved durability.

However, very severe requirements are imposed on magnetic recording media with respect to such physical properties as durability, scratch resistance, dynamic friction, and moving stability, as well as electromagnetic properties. There is a demand for a further improvement in magnet recording media.

Furthermore, the metal thin film type media have a magnetic layer as thin as 0.05 to 0.5 $\mu$m so that the surface property of the media depends on that of a substrate. For example, Japanese patent application Kokai No. 53-116115 discloses the provision of gently sloping protrusions in the form of creases or wrinkles on the substrate surface. Also, Japanese Patent Application Kokai Nos. 58-68227 and 58100221 disclose the location of fine particles on the substrate surface, resulting in surface irregularities observable under an optical microscope with a magnifying power of 50 to 400 and actually measureable for height by means of a probe surface roughness meter. These media are, however, still insufficient in physical properties such as dynamic friction, runnability (or durability of tape which travels in frictional contact with rigid members in a recording/reproducing machine), and moving stability as well as in electromagnetic properties. They also exhibit poor scratch resistance.

SUMMARY OF THE INVENTION

Therefore, an object of the present invention is to provide a novel and improved magnetic recording medium having excellent adherence between a substrate and a magnetic layer, scratch resistance and durability as well as good electromagnetic properties. Another object is to provide a novel and improved magnetic recording medium having excellent runnability, still performance and moving stability.

According to the present invention, there is provided a magnetic recording medium comprising a substrate, a plasma polymerized film on the substrate, and a ferromagnetic metal thin film layer on the plasma polymerized film, wherein the plasma polymerized film is comprised of carbon, or carbon and at least one optional element selected from hydrogen, nitrogen and oxygen.

BRIEF DESCRIPTION OF THE DRAWING

The above and other objects, features, and advantages of the present invention will be more fully understood by reading the following description when taken in conjunction with the accompanying drawing, in which.

the only drawing.

DESCRIPTION OF THE PREFERRED EMBODIMENTS

The magnetic recording medium of the present invention has a plasma polymerized film on a substrate.

The plasma polymerized film is a thin film comprised of carbon. It may be formed of carbon (C) alone or carbon in admixture with any other elements. When the plasma polymerized film is formed from carbon and another element, such an optional element is selected from hydrogen (H), nitrogen (N) and oxygen (O), and mixtures thereof.

A source material used in plasma polymerization to form the plasma polymerized film is a gaseous reactant. The gaseous reactant used is generally at least one reactant selected from hydrocarbons which are gaseous at room temperature, such as methane, ethane, propane, butane, pentane, ethylene, propylene, butene, butadiene, acetylene, methylacetylene, and other saturated and unsaturated hydrocarbons. Those hydrocarbons which are liquid at room temperature may also be used as the reactant if desired. Another preferred source material is a mixture of such a hydrocarbon or hydrocarbons with at least one inorganic gas such as $H_2$, $O_2$, $O_3$, $H_2O$, $N_2$, $NO_x$ including NO, $N_2O$, $NO_2$, etc., $NH_3$, CO, and $CO_2$. Further, the source material may optionally contain a minor proportion of a material containing Si, B, P, S or a similar trace element.

When a plasma polymerized film consisting of carbon is desired, a gaseous mixture of a hydrocarbon and a large proportion of hydrogen is subjected to plasma polymerization to thereby form a carbon film. The carbon structure of the thus formed carbon film varies with the ratio of mixed reactants, plasma producing power, substrate temperature, and other factors.

The plasma polymerized film is formed from such a reactant or reactant mixture to a thickness of 5 to 80 Å. A thicker plasma polymerized film in excess of 80 Å is rather low in the strength of film itself because internal stresses induced during film formation are left in the film. Such a thicker film is too hard to offer satisfactory durability as a flexible medium, failing to provide an acceptable magnetic recording medium. Films thinner than 5 Å are ineffective for the purpose of the present invention. It is to be noted that film thickness may be measured by means of an ellipsometer, for example. The plasma polymerized film may be formed to any desired thickness by controlling such factors as reaction time and reactant gas flow rate during film formation.

The plasma polymerized film may be formed on a substrate by exposing the substrate to a discharge plasma of the reactant or reactants.

The principle of plasma polymerization will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma. Since gaseous molecules have a less chance of collision with electrons and absorb little energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of additive chemical reaction such as polymerization while being kept relatively unchanged from the original. The present invention utilizes this phenomenon to form plasma polymerized films on substrates. The utilization of a low temperature plasma avoids any thermal influence on substrates.

Figure 1:
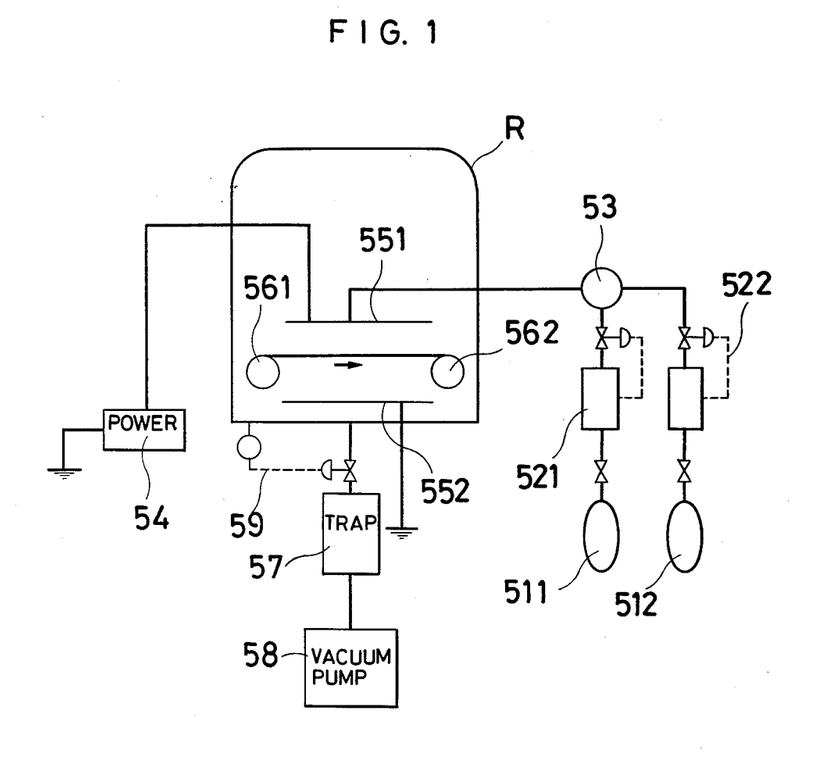
FIG. 1 is a schematic illustration of a plasma polymerizing apparatus having a DC, AC, or variable frequency power source.

FIG. 1 illustrates a typical apparatus in which a plasma polymerized film is formed on the surface of a substrate. This plasma apparatus uses a variable frequency power source. The apparatus comprises a reactor vessel R into which a gas reactant or reactants are introduced from a source 511 and/or 512 through a mass flow controller 521 and/or 522. When desired, different gaseous reactants from the sources 511 and 512 may be mixed in a mixer 53 to introduce a gas mixture into the reactor vessel. The gas reactants each may be fed at a flow rate of 1 to 250 ml per minute.

Disposed in the reactor vessel R is means for supporting a substrate on which a plasma polymerized film is to be formed, in this embodiment, a set of supply and take-up rolls 561 and 562 on which a base web for magnetic tape is wound. Depending on the particular shape of the magnetic recording medium, any desired supporting means may be used, for example, a rotary support apparatus on which the substrate rests.

On the opposed sides of the substrate are located a pair of opposed electrodes 551 and 552. One electrode 551 is connected to a variable frequency power source 54 and the other electrode 552 grounded.

The reactor vessel R is further connected to a vacuum system for evacuating the vessel, including a liquefied nitrogen trap 57, an oil rotary vacuum pump 58 and a vacuum controller 59. The vacuum system has the capacity of evacuating and keeping the reactor vessel R at a vacuum of 0.01 to 10 Torr.

In operation, the reactor vessel R is first evacuated by means of the vacuum pump 58 to a vacuum of $10^3$ Torr or lower before a gas reactant or reactants are fed into the vessel at a predetermined flow rate. Then the interior of the reactor vessel is maintained at a vacuum of 0.01 to 10 Torr. When the flow rate of the reactant gas mixture and the rate of transfer of the substrate in the case of continuous operation become constant, the variable frequency power 54 is turned on to generate a plasma with which a plasma polymerized film is formed on the substrate.

In combination with the reactant gas, argon, helium, nitrogen, and hydrogen may be used as a carrier gas. It is to be noted that other parameters including supply current and treating time may be as usual or properly selected without undue experimentation.

In this plasma polymerization, the plasma may be created by a microwave discharge, DC discharge and AC discharge as well as high frequency discharge.

The plasma polymerized film thus formed contains C and at least one element selected from H, N and 0 as previously described. The content of C may preferably range from 30 to 100 atom percents of the plasma polymerized film. The content of C may be more preferably not less than 30 atom percents and less than 100 atom percents, especially from 30 to 90 atom percents. A plasma polymerized film having a carbon content of less than 30 atom % has a reduced film strength below the acceptable level.

One or more elements of H, N and O are optionally contained along with C in the plasma polymerized film. Preferably, these elements are contained in such amounts that the atomic ratio of hydrogen to carbon (H/C) is up to 1, more preferably from 1/6 to 1, the atomic ratio of nitrogen to carbon (N/C) is up to 3/10, more preferably from 1/20 to 3/10, and the atomic ratio of oxygen to carbon (O/C) is up to 3/10, more preferably from 1/20 to 3/10. The inclusion of H and N and/or O along with C adds to the scratch resistance of the associated medium.

The contents of C, H, N, O and other elements contained in the plasma polymerized film may be determined by secondary ion mass spectroscopy (SIMS). Since the plasma polymerized film used in the practice of the present invention is 5 to 80 Å thick, the contents of C, H, N, O and other elements may be calculated by counting the respective elements on the film surface by SIMS. The measurement of SIMS may be in accord with the article "SIMS and LAMMA" in the Surface Science Basic Lectures, Vol. 3, 1984 (Tokyo), Elementary and Application of Surface Analysis, page 70. Alternatively, the contents of C, H, N, O and other elements may be calculated by determining the profile of the respective elements while effecting ion etching with Ar or the like.

The plasma polymerized film is preferably formed on the substrate which has been plasma treated. The surface of the substrate becomes more adherent by treating it with a plasma so that the adherence between the substrate and a subsequently applied magnetic layer is eventually improved.

The plasma treatment of the substrate surface may be effected by substantially the same process as previously described for the plasma polymerization with respect to its principle, operation, and conditions. The difference is that an inorganic gas is used as the treating gas in the plasma treatment of the substrate whereas the formation of a plasma polymerized film by plasma polymerization uses an organic gas optionally containing an inorganic gas as the reactant gas.

The treating gas employed in the plasma treatment of the substrate is not particularly limited. Any inorganic gases may be used for the purpose, for example, $H_2$, Ar, He, $N_2$, $O_2$, and air. Preferred among them is an inorganic gas containing at least one of O, N, and H. The preferred inorganic gas may be selected from $H_2$, $O_2$, $O_3$, $H_2O$, $N_2$, $NH_3$, $NO_x$ including NO, $N_2O$, and $NO_2$, etc. They may be used alone or in admixture with a rare gas such as argon, helium and neon.

The type of the electric source used for the plasma treatment is not particularly limited, and DC, AC, and microwave sources may be used. In this plasma treatment, the preferred power source has a frequency in the range of 10 to 200 kilohertz. With a plasma treatment at a frequency of 10 to 200 KHz, durability and bond strength are markedly increased.

The plasma polymerized film is formed on the surface of a substrate, which has been plasma treated in one preferred embodiment. According to the present invention, a magnetic layer is formed on the plasma polymerized film with or without interposing an undercoat or intermediate layer therebetween.

The magnetic layer of the present invention may be a ferromagnetic metal thin film layer. The ferromagnetic metal thin film layer is simply referred to as magnetic thin film.

The magnetic thin film may have a composition consisting of an elemental ferromagnetic metal such as iron, cobalt, and nickel or a ferromagnetic metal alloy such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Al, Co-Ni-Na, Co-Ni-Ce, Co-Ni-Cr, Co-Ni-Zn, Co-Ni-Cu, Co-Ni-W, Co-Ni-Re, and Co-Sm-Cu, but is not limited thereto. The magnetic thin film composition may contain oxygen (O).

Preferably, the magnetic thin film has a thickness of 0.05 to 0.5 $\mu$m, more preferably from 0.07 to 0.3 $\mu$m.

The magnetic thin film is formed by any vapor and liquid phase plating techniques. The plating process used in the practice of the present invention is to coat the surface of an object with a thin film of ferromagnetic metal in firm attachment and full coverage. Examples of the vapor phase plating processes are vacuum deposition or evaporation, sputtering, ion plating, and sometimes, thermal CVD (chemical vapor deposition) and plasma CVD. Examples of the liquid phase plating processes are electroless plating and sometimes, electrolytic plating.

Some vapor phase plating processes most commonly used in forming such magnetic thin films will be described in detail.

The vacuum deposition process is by heating an evaporation source material in a high vacuum of $10^{-3}$ Torr or lower by an electron beam or resistance heating method, thereby melting and evaporating the source material. The resulting vapor is then deposited on the surface of an object as a thin film. Upon evaporation, a kinetic energy of 0.1 eV to 1 eV is generally imparted to evaporated particles.

The sputtering process may be further classified into plasma sputtering and ion beam sputtering depending on the region where operation is conducted.

In the plasma sputtering process, an abnormal glow discharge is generated in an atmosphere of an inert gas such as argon, a target of source material to be evaporated is sputtered with the resulting Ar ions, and the thus generated vapor of source material is deposited or condensed on the substrate. Included are a DC sputtering technique wherein a DC voltage of several kilovolts is applied and a high frequency sputtering technique wherein a high frequency power of several to several hundred kilowatts is applied. A magnetron type sputtering technique is also useful wherein a multi-pole sputtering equipment such as two, three or four pole sputtering equipment is used, and electromagnetic fields are applied in two perpendicular directions to impart a cycloidal motion to electrons in the plasma, as by a magnetron, to form a high density plasma, thereby reducing the voltage applied and improving the sputtering efficiency. If desired, instead of a pure inert gas atmosphere such as argon, there may be used reactive or chemical sputtering wherein sputtering is carried out in an atmosphere containing an active gas such as $O_2$ and $N_2$ in admixture with argon.

In the ion beam sputtering process, argon (Ar) or the like is ionized using a suitable ionization source. The ionized Ar is driven out as an ion beam in a high vacuum by applying a negative high voltage across driving electrodes. The ion beam is impinged on the surface of a target of source material to be evaporated. The resulting vapor of source material is deposited or condensed on the substrate.

The operation pressure ranges from about $10^{-2}$ to $10^{-3}$ Torr in either case. These sputtering processes impart particles of source material with a kinetic energy of about several eV (electron volts) to about 100 eV which is substantially greater than the kinetic energy of about 0.1 eV to about 1 eV given by the evaporation processes.

Next, the ion plating process is an atomic film forming process wherein evaporated material ions having a sufficient kinetic energy are bombarded on the surface of an object before and during formation of a film thereon. The basic functions involved are sputtering, heating and ion implantation of the object by bombarding ions, which affect the adherence, nucleation and growth of a film being deposited. The ion plating process may be further classified into plasma and ion beam processes depending on the region where operation is carried out.

In the plasma ion plating process, an object held at a negative potential is cleaned by impinging Ar+ or similar cations thereon under a DC glow discharge, and an evaporation source is then heated to evaporate the source material which is ionized in the plasma. The resulting source material ions are accelerated under an electric field of increased intensity in a cathodic dark region of the glow discharge surrounding the substrate and then bombarded on the substrate with a high energy, whereby the material deposits on the substrate. Any techniques of plasma ion plating may be employed including DC application, high frequency excitation, and their combination, and their combination with various heating modes of the evaporation source. A plasma electron beam technique using a hollow cathode plasma electron gun may also be employed.

In the ion beam plating process, a source material is converted into ions by any ion producing means including sputtering, electron bombardment, or modified duoplasmatron equipment. The resulting vapor of source material ions is driven out into a high vacuum region under a controlled accelerating voltage to successively carry out cleaning and deposition on the surface of an object. A cluster ion beam technique for evaporation and crystal growth may also be employed wherein a jet of source material is injected from a crucible into a high vacuum through an injection nozzle to form a cluster containing $10^2$ to $10^3$ loosely combined atoms by utilizing an overcooling phenomenon due to adiabatic expansion.

The kinetic energy imparted to ions by ion plating is in the range of from about several ten eV to about 5000 eV, which is greatly higher than that given by dry coating processes, for example, evaporation process (about 0.1 eV to about 1 eV) and sputtering process (about several eV to about 100 eV). For this reason, the film deposited by ion plating exhibits an outstandingly increased adherence. An increased rate of deposition completes film formation within a short time.

A recently developed arc discharge ion plating technique involving thermionic ionization may also be used. The arc discharge ion plating technique includes heating an evaporation source to form a stream of vapor, impinging electrons emitted from a thermionic emission source against the vapor stream at a position near the evaporation source where the vapor stream is relatively dense, thereby ionizing the vapor stream, and focusing the ionized vapor stream under an electric or magnetic field at an object in a direction perpendicular thereto.

The other plating process used in the practice of the present invention is a liquid phase plating process, typically electroless plating.

For the electroless plating, the bath composition may be any of known baths and operated under any desired plating conditions. In this respect, reference is made to the bath compositions and plating conditions disclosed in Japanese Patent Publication Nos. 40-8001, 49-29561, 54-17439, 55-14865, and 58-17824.

Preferably, the magnetic thin films used in the practice of the present invention contain cobalt (Co) as an essential element and at least one element selected from nickel (Ni), chromium (Cr), and oxygen (O) as an optional element. The magnetic thin films may preferably consist essentially of Co, Co+Ni, Co+O, or Co+Ni+O. That is, they may consist essentially of Co alone or Co and Ni. When they are formed from cobalt and nickel, the weight ratio of Co/Ni is preferably 1.5 or higher. In addition to Co alone or Co plus Ni, the magnetic thin film may contain oxygen (O) atoms with the results of better electromagnetic properties and runnaility Preferably, the atomic ratio of O/Co (when nickel free) or O/(Co+Ni) is up to 0.5 and especially ranges from 0.15 to 0.45.

Better results are obtained when the magnetic thin films contain chromium (Cr) in addition to Co, Co+Ni, Co+O, or Co+Ni+O. Electromagnetic properties, output, S/N ratio, and film strength are then improved. Preferably, the weight ratio of Cr/Co (when nickel free) or Cr/(Co+Ni) ranges from 0.001 to 0.1, especially from 0.005 to 0.05.

The magnetic thin films may further contain trace amounts of other elements, for example, transition metal elements such as Fe, Mn, V, Zr, Nb, Ta, Mo, W, Ti, Cu, Zn, etc.

The magnetic thin film preferably consists of coalesced particles of columnar crystal structure each directed at an angle with respect to a normal to the major surface of the substrate because of better electromagnetic properties. Preferably, the particles of columnar crystal structure are at an angle between 20° and 60° with respect to a normal to the major surface of the substrate. In general, they have a length extending throughout the magnetic layer in its thickness direction and a breadth of the order of 50 to 500 Å. Cobalt and optional elements of Ni and Cr form columnar crystals themselves while oxygen (O) atoms, when added, are present in the form of oxides on the surface of each columnar crystal.

The magnetic thin films are generally formed as a monolithic layer, but may be formed from a plurality of plies with or without an intermediate ply which may be a nonmagnetic metal thin film.

The most common process for forming the magnetic thin films is an oblique evaporation technique among the many other vapor phase plating techniques previously described. The standard oblique evaporation technique may be employed wherein the minimum incident angle with respect to a normal to the substrate is preferably at least 30°. Well-known evaporation conditions may be employed and any suitable post treatment may be carried out if necessary. One useful post treatment is a post treatment for the introduction of oxygen which may be conducted in various ways.

The magnetic thin film may be formed on its surface with a coating of metal oxide by any suitable oxidizing treatment.

The magnetic layer of the present invention may have a composition comprising a particulate magnetic material and a binder.

The particulate magnetic material used in the magnetic layer of the present invention may be oxide particles, typically iron oxide particles such as $\gamma\text{-Fe}_2\text{O}_3$ particles and cobalt-coated iron oxide particles, barium and strontium ferrite particles, and $CrO_2$ particles, metal particles, or a mixture thereof.

The preferred form of $\gamma\text{-Fe}_2\text{O}_3$ particles used herein may be prepared by dehydrating α-FeOOH (goethite) at 400° C. or higher into α-Fe$_2$O$_3$, reducing at 350° C. or higher in hydrogen gas into Fe$_3$O$_4$, and then oxidizing at 250° C. or lower. Alternatively, γ-FeOOH (lepidocrocite) may be dehydrated, reduced, and oxidized.

The cobalt-coated iron oxide particles used herein may be $\gamma\text{-Fe}_2\text{O}_3$ or Fe$_3$O$_4$ particles having divalent cobalt cations ($Co^{2+}$) diffused into a very thin surface layer of up to several ten angstroms deep from the surface.

The barium ferrites used herein include a hexagonal barium ferrite conforming to $BaFe12O_{19}$ and analogues, and partially substituted barium ferrites of the same formula wherein soe Ba and Fe atoms are replaced by other metal atoms such as Ca, Sr, Pb, Co, Ni, Ti, Cr, Zn, In, Mn, Cu, Ge, Nb, Zr, Sn, etc.

Berrium ferrite and analogues may be prepared by any desired processes, for example, ceramic process, codeposition-sintering process, hydrothermal synthesis process, flux process, glass crystallization process, alkoxide process, and plasma jet process. These processes are described in detail in an article by Y. Koike and O. Kubo, "Ceramics", 18, No. 10 (1983). The same appplies to strontium ferrites.

The magnetic metal particles used herein include (1) those obtained by starting with iron oxyhydroxides such as $\alpha$-FeOOH (goethite), $\beta$-FeOOH (akaganite), and $\gamma$-FeOOH (lepidocrocite); iron oxides such as $\alpha$-$Fe_2O_3$, $\gamma$-$Fe_2O_3$, $Fe_3O_4$, and $\gamma$-$Fe_2O_3$-$Fe_3O_4$ (solid solution); and iron particles doped with one or more metals selected from Co, Mn, Ni, Ti, Bi, Be, and Ag and having an aluminum or silicon compound adsorbed or applied on their surface, and heat reducing them in a reducing gas stream to produce a magnetic powder consisting of iron or consisting of a major proportion of iron, (2) those obtained by the liquid phase reduction of a metal salt in water with $NaBH_4$, and (3) those obtained by evaporating metals in an inert gas atmosphere under a reduced pressure.

The magnetic metal particles may have a composition consisting essentially of elemental iron, cobalt, and nickel alone, and alloys thereof, and the individual metals and their alloys both having an additional metal added thereto, for example, one or more metals selected from Cr, Mn, Co, and Ni, and optionally, from Zn, Cu, Zr, Al, Ti, Bi, Ag, and Pt.

It is also contemplated to add a minor proportion of a non-metallic element or elements such as B, C, Si, P, and N to these metals. Partially nitrided metal magnetic particles such as $Fe_4N$ or magnetic particles having ion carbide at least on the surface thereof may also be included.

Also, the magnetic metal particles may have an oxide coating on the surface thereof. The magnetic recording media using magnetic metal particles having an oxide coating are advantageously resistant to any influences of an ambient environment such as a reduction in magnetic flux density due to the influence of temperature and humidity and a deterioration of properties due to the occurrence of rust in the magnetic layer. However, there arises a problem that the magnetic layer has an increased electric resistance which causes troubles due to electric charging during use.

The magnetic particles may have either needle or granular form and a proper choice may be made depending upon the intended use of the magnetic recording medium.

The magnetic coating composition is prepared from the particulate magnetic material with the aid of a binder which may be selected from radiation curable resins, thermoplastic resins, thermosetting resins, and reactive resins, and mixtures thereof. The thermosetting resins and radiation curable resins are preferred because of the strength of the resultant coatings.

The thermoplastic resins used herein are resins having a softening point of lower than 150° C., an average molecular weight of 10,000 to 200,000, and a degree of polymerization of about 200 to 2,000.

The thermosetting and reactive resins used herein have a similar degree of polymerization. Upon heating after coating and drying, they are converted through condensation, addition or other reactions into polymers having an infinite molecular weight. Preferred among them are those which do not soften or melt until they are thermally decomposed.

Some illustrative non-limiting examples of the resins include resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/-triphenylmethane triisocyanate, etc.; mixtures of any one of the foregoing condensation polymerization resins and a crosslinking agent such as isocyanates; mixtures of a crosslinking agent and a vinyl copolymeric resin such as a vinyl chloride-vinyl acetate copolymer (which may have carboxylic units incorporated therein), a vinyl chloride-vinyl alcohol-vinyl cetate copolymer (which may have carboxylic units incorporated therein), a vinyl chloride-vinylidene chloride copolymer, chlorinated polyvinyl chloride, a vinyl chloride-acrylonitrile copolymer, a vinyl butyral copolymer, a vinyl formal copolymer, etc.; mixtures of a crosslinking agent and a cellulosic resin such as nitrocellulose, cellulose acetobutyrate, etc.; mixtures of a crosslinking agent and a synthetic rubber such as butadieneacrylonitrile, etc.; and mixtures of any of the foregoing members.

These thermosetting resins may generally be cured by heating in an oven at about 50 to 80° C. for about 6 to 100 hours. Alternatively, they may be slowly transferred through an oven at 80° to 120° C.

Among the preferred binders are radiation-curable resins, that is, resins obtained by partially curing a radiation-curable compound.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having unsaturated double bonds capable of crosslinking or polymerizing upon exposure to radiation may also be used.

Typical of the resins in the form of thermoplastic resins having contained in their molecule groups capable of crosslinking or polymerizaing upon exposure to radiation are unsaturated polyester resins. Included are polyester resins having radiation-sensitive unsaturated double bonds in their molecular chain, for example, unsaturated polyester resins which may be prepared by a standard process of esterifying polybasic acids of (2) as will be described below and polyhydric alcohols into saturated polyester resins except that the polybasic acids are partially replaced by maleic acid so that the resulting polyesters may have radiation-sensitive unsaturated double bonds.

The radiation-curable unsaturated polyester resins may be prepared by adding maleic acid or fumaric acid to at least one polybasic acid and at least one polyhydric alcohol, conducting dewatering or alcohol-removing reaction in a conventional manner, that is, in a nitrogen atmosphere at 180 to 200° C. in the presence of a catalyst, raising the temperature to 240 to 280° C., and conducting condensation reaction at the temperature under a vacuum of 0.5 to 1 mmHg. The amount of maleic or fumaric acid added may be 1 to 40 mol %, and preferably 10 to 30 mol % of the acid reactant in consideration of crosslinking and radiation curing properties during preparation.

Examples of the thermoplastic resins which can be modified into radiation-curable resins will be described below.

(1) Vinyl chloride copolymers

Included are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate-OH terminated, alkyl branched copolymers, for example, VROH, VYNC, VYEGX, VERR, VYES, VMCA, VAGH, UCARMMAG 520, and UCARMAG 528 (all trade names, manufactured by U.C.C.), and analogues. These copolymers may be modified to be radiation sensitive by incorporating acrylic, maleic, or allyl double bonds. They may additionally contain carboxylic units.

(2) Saturated polyesater resins

Included are saturated polyesters obtained by esterifying saturated polybasic acids such as phthalic acid, isophthalic acid, terephthalic acid, succinic acid, aidpic acid, sebasic acid, etc. with polyhydric alcohols such as ethylene glycol, diethylene glycol, glycerine, trimethylolpropane, 1,2-propylene glycol, 1,3-butanediol, dipropylene glycol, 1,4-butanediol, 1,6-hexanediol, pentaerithritol, sorbitol, neopentyl glycol, 1,4-cyclohexanedimethanol, etc., and products obtained by modifying these resins with SO$_3$Na or the like, for example, Vyron 53S (trade name, Toyobo K.K.). They may be modified to be radiation sensitive.

(3) Polyvinyl alcohol resins

Included are polyvinyl alcohol, butyral resins, acetal resins, formal resins, and copolymers of such units. They may be modified to be radiation sensitive by acting on a hydroxyl group in them.

(4) Epoxy resins and phenoxy resins

Included are epoxy resins formed by reaction of bisphenol-A with epichlorohydrin and methyl epichlorohydrin, for example, Epicoat 152, 154, 828, 1001, 1004, and 1007 (trade names, manufactured by Shell Chemicals), DEN 431, DER 732, DER 511 and DER 331 (trade names, manufactured by Dow Chemicals), Epichlon 400 and 800 (trade names, manufactured by Dai-Nihon Ink K.K.); phenoxy resins which are epoxy resins having a high degree of polymerization, for example, PKHA, PKHC, and PKHH (trade names, manufactured by U.C.C.); and copolymers of brominated bisphenol-A with epichlorohydrin, for example, Epichlon 145, 152, 153, and 1120 (trade names, manufactured by Dai-Nihon Ink K.K.). Also included are carboxyl radical-containing derivatives of the foregoing resins.

These resins may be mdified to be radiation sensitive by using an epoxy group contained therein.

(5) Cellulosic derivatives

A variety of cellulosic derivatives may be used although nitrocellulose, cellulose acetobutyrate, ethyl cellulose, butyl cellulose, acetyl cellulose, and analogues are preferred. These resins may be modified to be radiation sensitive by using a hydroxyl group contained therein.

Additional examples of the resins which can be subjected to radiation sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, hydroxyl-containing acrylic esters, and acrylic resins containing at least one methacrylate as a polymer component.

Examples of the elastomers and prepolymers are presented below.

(i) Polyurethane elastomers, prepolymers and oligomers

Polyurethanes are very useful because of abrasion resistance and adhesion to substrates, for example, PET films. Illustrative polyurethane elastomers and prepolymers are condensation polymerization products from (a) polyfunctional isocyanates such as 2,4-toluenediisocyanate, 2,6-toluenediisocyanate, 1,3-xylenediisocyanate, 1,4xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Also included are those having an OH or COOH terminal group as a polar group.

Also included are monomers having active hydrogen capable of reacting with an isocyanate group and an unsaturated double bond capable of radiation curing, for example, mono- and diglycerides of long chain fatty acids having an unsaturated double bond.

(ii) Acrylonitrile-butadiene copolymerized elastomers

Acrylonitrile-butadiene copolymerized prepolymers having a hydroxyl terminal group commercially available as Poly BD Liquid Resin from Sinclair Petro-Chemical and elastomers commercially available as Hiker 1432J from Nihon Zeon K.K. are adequate because the double bond of a butadiene unit is capable of generating a radical upon exposure to radiation to facilitate crosslinking and polymerization.

(iii) Polybutadiene elastomer

Low molecular weight prepolymers having a hydroxyl terminal group commercially available as Poly BD Liquid Resin R-15 from Sinclair Petro-Chemical and the like are preferred because they are compatible with thermoplastic resins. R-15 prepolymers whose molecule is terminated with a hydroxyl group can be more radiation sensitive by adding an acrylic unsaturated double bond to the molecule end, which is more advantageous as a binder component.

Also, cyclic products of polybutadienes commercially available as CBR-M901 from Nihon Synthetic Rubber K.K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K.K.) while elastomers, for example, epoxy-modified rubbers and internally plasticized, saturated linear polyesters (commercially available as Vyron #300 from Toyobo K.K.) may also be useful provided that they are subjected to radiation sensitive modification.

The radiation-curable compounds having unsaturated double bonds which may be used as oligomers and monomers in the present invention include styrene, ethylacrylate, ethylene glycol diacrylate, ethylene glycol dimethacrylate, diethylene glycol acrylate, diethylene glycol dimethacrylate, 1,6-hexaneglycol diacrylate, 1,6-hexaneglycol dimethacrylate, N-vinylpyrrolidone, pentaerythritol tetraacrylate (and methacrylate), pentaerythritol triacrylate (and methacrylate), trimethylolpropane triacrylate, trimethylolpropane trimethacrylate, polyfunctional oligoester acrylates (e. g., Aronix M-7100, M-5400, 5500, 5700, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone-acryl group attached thereto:

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

(1)

(Special acrylate A)

(2)

(Special acrylate B)

(3)

(Special acrylate C)

(4)

(Special acrylate D)

(5)

(Special acrylate E)

(6)

(Special acrylate F)

(7)

(Special acrylate G)

(8)

(Special acrylate H)

(9)

-continued
(Special acrylate I)

(10)

(Special acrylate J)

(11)

A: acrylic acid   X: polyhydric alcohol
Y: polybasic acid
(Special acrylate K)

$$A\!\!-\!\!(M\!-\!N)_{\overline{n}}M\!-\!A \quad (12)$$

A: acrylic acid  M: dihydric alcohol  N: dibasic acid
(Special acrylate L)

Among known polymers, polymers of one type degrade while polymers of another type give rise to crosslinking between molecules upon exposure to radiation.

Included in the crosslinking type are polyethylene, polypropylene, polystyrene, polyacrylate, polyacrylamide, polyvinyl chloride, polyester, polyvinyl pyrrolidone rubber, polyvinyl alcohol, and polyacrolein. Since these polymers of the crosslinking type give rise to crosslinking reaction without any particular modification as previously described, they may also be used as the radiation-curable binder as well as the above-mentioned modified products.

These radiation-curable resins may be cured by any of various well-known methods.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

Electron radiation may also be used. Preferably, a radiation accelerator is operated at an accelerating voltage of 100 to 750 kV, more preferably 150 300 kV to generate radiation having a sufficient penetrating power such that the object is exposed to a radiation dose of 0.5 to 20 megarad.

Particularly preferred types of radiation for exposure include radiation generated by a radiation accelerator and ultraviolet radiation because of ease of control of a dose, simple incorporation in a manufacturing line, and electromagnetic radiation shielding.

The radiation curing process allows solventless resin compositions to cure within a short time and thus, such solvent-free resin compositions may be conveniently used in the practice of the present invention.

The use of radiation-curable resins prevents a roll of tape having a large diameter know as a jumbo roll from being tightened. Then no substantial difference in electromagnetic properties is induced between the outside and inside coils of the jumbo roll, resulting in improved properties. Besides, productivity is improved since curing can be carried out as an on-line operation in magnetic tape production. A benefit is also obtained for disk-shaped magnetic sheets in that the tendency of sheets curling due to previous storage in wound roll form is prevented.

Preferably, the weight ratio of particulate magnetic material to binder ranges from 1/1 to 9/1, and more preferably from 3/2 to 6/1. Weight ratios of lower than 1/1 result in a low saturation magnetic flux density. At ratios of higher than 9/1, the particulate magnetic material cannot be well dispersed in the binder so that the resulting coating is rough at the surface and brittle.

A non-reactive solvent may optionally be used in the practice of coating of the magnetic layer. No particular limit is imposed on the non-reactive solvent and a suitable solvent may be chosen by taking into account the solubility of and compatibility with the binder. Some illustrative nonlimiting examples of the non-reactive solvents include ketones such as acetone, methyl ethyl ketone, methyl isobutyl ketone, cyclohexanone, etc.; esters such as ethyl formate, ethyl acetate, butyl acetate, etc.; alcohols such as methanol, ethanol, isopropanol, butanol, etc.; aromatic hydrocarbons such as toluene, xylene, ethylbenzene, etc.; ethers such as isopropanol ether, ethyl ether, dioxane, etc.; and furans such as tetrahydrofuran, furfural, etc., alone or in admixture. The solvents may be used in amounts of 10 to 10,000% by weight, preferably 100 to 5,000% by weight based on the binder.

The magnetic layer of the coating type may further contain an inorganic pigment. Some illustrative nonlimiting examples of the inorganic pigments includes inorganic fillers such as $SiO_2$, $TiO_2$, $Al_2O_3$, $Cr_2O_3$, SiC, CaO, $CaCO_3$, zinc oxide, goethite, $\gamma\text{-}Fe_2O_3$, talc, kaolin, $CaSO_4$, boron nitride, graphite fluoride, molybdenum disulfide, and ZnS. Also employable are finely divided pigments such as aerosil and colloidal pigments including $SiO_2$, $Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$, $SnO_2$, etc. Typical forms of these finely divided pigments are, in the case of $SiO_2$, for example, (1) colloidal solutions of ultrafine silicic acid anhydride (e.g., Snowtex, aqueous methanol silica sol manufactured by Nissan Chemicals K.K.) and (2) ultrafine anhydrous silicas prepared by pyrolysis of pure silicon tetrachloride (standard product 100 Å; Aerosil manufactured by Nihon Aerosil K.K.). Aluminum oxide, titanium oxide, and the aforementioned finely divided pigments may also be in the form of (1) colloidal solution of ultrafine particles or (2) ultrafine particulates prepared by a gas phase process as mentioned above for silicon dioxide or electrolytically processed product.

These inorganic pigments may be used in amounts of about 1 to 30 parts by weight per 100 parts by weight of the particulate magnetic material. The use of the inorganic pigments in excess amounts results in a brittle coating which produces more dropouts.

The inorganic pigments may preferably have a diameter of up to 0.7 μm, more preferably up to 0.5 μm.

In the practice of the present invention, the need for electroconductive or antistatic agents such as carbon black, graphite and graphitized carbon is eliminated although they may be used in minor amounts.

The magnetic layer of the coating type may further contain a dispersant. Some illustrative non-limiting examples of the dispersants include organic titanium coupling agents, silane coupling agents, and surface active agents, for example, natural surface active agents also serving as an anti-static agent, such as saponin; nonionic surface active agents such as alkylene oxide, glycerine, and glycidol surface active agents; cationic surface active agents such as higher alkyl amines, quaternary ammonium salts, heterocyclic compounds (e.g. pyridine), phosphoniums and sulfoniums; anionic surface active agents containing an acidic radical such as carboxylic acid, sulfonic acid, phosphoric acid, sulfate ester radicals, and phosphate ester radicals; and amphoteric surface active agents such as amino acids, aminosulfonic acids, sulfates and phosphates of amino alcohols.

The magnetic layer of the coating type may further contain a lubricant. The lubricants used herein include well-known lubricants commonly used in magnetic recording media of the type, for example, silicone oils, fluoride oils, fatty acids, fatty acid esters, paraffins, liquid paraffins, and various surface active agents, with the fatty acids and/or fatty acid esters being preferred. Some illustrative non-limiting examples of the fatty acids include fatty acids containing at least 12 carbon atoms represented by RCOOH wherein R is an alkyl group having at least 11 carbon atoms, for example, caprylic acid, capric acid, lauric acid, myristic acid, palmitic acid, stearic acid, behenic acid, oleic acid, elaidic acid, linolic acid, linoleic acid, and stearolic acid; and examples of the fatty acid esters include fatty acid esters of a monobasic fatty acid having 12 to 16 carbon atoms with a monohydric alcohol having 3 to 12 carbon atoms and fatty acid esters of a monobasic fatty acid having at least 17 carbon atoms with a monohydric alcohol providing a total of 21 to 23 carbon atoms together with the fatty acid. Also employable are metal soaps in the form of alkali metal (e.g., Li, Na, K) and alkaline earth metal (e.g., Mg, Ca, Ba) salts of the aforementioned fatty acids and lecithin.

Silicones used may be those modified with a fatty acid and those partially modified with fluoride. Alcohols used may be higher alcohols. Fluorides used may be those prepared by electrolytic substitution, teromerization and oligomerization processes.

Among other lubricants, radiation-curable lubricants may conveniently be used. The use of such curable lubricants prevents the transfer of the morphology of the front surface to the rear surface adjoined in roll form, affording some advantages of reduced dropouts, minimized difference in output between the outside and inside coils of a roll of tape, and on-line production.

Examples of the radiation-curable lubricants include compounds containing a molecular chain capable of lubrication and an acrylic double bond in their molecule, for example, acrylates, methacrylates, vinyl acetate, acrylic acid amides, vinyl alcohol esters, methyl vinyl alcohol esters, allyl alcohol esters, glycerides, and the like. These lubricants may be represented by the following structural formulae:

wherein R is a straight or branched, saturated or unsaturated hydrocarbon radical having at least 7 carbon atoms, preferably from 12 to 23 carbon atoms.

They may be fluoride substituted lubricants, which may be represented by the following structural formulae:

Some preferred examples of these radiation-curable lubricants include stearic acid methacrylate (acrylate), methacrylate (acrylate) of stearyl alcohol, methacrylate (acrylate) of glycerine, methacrylate (acrylate) of glycol, and methacrylate (acrylate) of silicone.

The dispersant and the lubricant each may be used in amounts of about 0.1 to 20 parts by weight per 100 parts by weight of the binder. These lubricants may be added to a magnetic coating composition during dispersion and/or applied to the surface of a magnetic coating as an overcoat.

Any of the additives which are commonly used in the magnetic layer of this type may also be employed in the magnetic layer of the present invention. Such additives include anti-static agents, for example, natural surface-active agents such as saponin; nonionic surface-active agents such as alkylene oxides, glycerins, and glycidols; cationic surface-active agents such as higher alkyl amines, quaternary ammonium salts, pyridine and other heterocyclic compounds, phosphonyl and sulfonyl compounds; anionic surface-active agents such as compounds containing an acid group such as carboxylic acid, sulfonic acid, phosphoric acid, sulfate, and phosphate groups; and amphoteric surface-active agents such as amino acids, aminosulfonic acids, and sulfuric and phosphoric acid esters of aminoalcohols.

Anyway, the magnetic coating composition may contain any suitable additives including the aforementioned antistatic agents, lubricants and dispersants in accordance with their known addition purposes.

The magnetic layer containing particulate magnetic layer and binder typically has a thickness of about 0.1 to 10 μm.

The magnetic recording medium thus organized as having a substrate, a plasma polymerized film, and a abovementioned ferromagnetic metal thin film layer as a magnetic layer in firm attachment in this order has preferebly fine protrusions on the medium surface at a specific density or population.

The fine protrusions preferably have a height of 30 to 300 Å, more preferably 50 to 250 Å as measured from the standard medium surface. The protrusions provided in the present invention have such dimensions that they are not observable under an optical microscope or measureable by a probe type surface roughness meter, but can only be observable under a scanning electron microscope. Larger protrusions in excess of 300 Å which are observable under an optical microscope are not desirable because of deteriorated electromagnetic properties and low moving stability. Smaller protrusions of lower than 30 Å are not effective in improving physical properties.

The protrusions should be distributed on the surface of the magnetic recording medium at an average density of at least $10^5$, and preferably $10^5$ to $10^9$, and more preferably $10^6$ to $10^9$, especially $10^6$ to $10^8$ per square millimeter of the surface. At protrusion densities of less than $10^5/mm^2$, there result increased noise, deteriorated still performance, and other disadvantages, which are undesirable in practical applications. Higher protrusion densities of more than $10^9/mm^2$ are rather less effective in improving physical properties. The protrusions generally have a diameter of 200 to 1,000 Å.

The protrusions may generally be provided by initially placing submicron particles on the surface of the substrate. The submicron particles used herein may have a particle size of 30 to 1,000 Å. Submicron protrusions are then formed on the top surface of the medium which conform to the submicron particles on the substrate surface in shape and size.

The submicron particles used in the practice of the present invention are those generally known as colloidal particles. Examples of the particles which can be used herein include $SiO_2$ (colloidal silica), $Al_2O_3$ (alumina sol), MgO, $TiO_2$, ZnO, $Fe_2O_3$, zirconia, CdO, NiO, $CaWO_4$, $CaCO_3$, $BaCO_3$, $CoCO_3$, $BaTiO_3$, Ti (titanium black), Au, Ag, Cu, Ni, Fe, various hydrosols, and resinous particles. Inorganic particles are preferred among others.

The submicron particles may be placed on the substrate surface, for example, by dispersing them in a suitable solvent to form a dispersion, and applying the dispersion to the substrate followed by drying. Any aqueous emulsion containing a resinous component may also be added to the particle dispersion before it is applied to the substrate. The addition of a resinous component allows gently sloping protrusions to form in conformity to the particles although it is not critical in the present invention.

Alternatively, protrusions may be formed by applying such a particle dispersion to the magnetic thin film as a topcoat layer rather than the placement of particles on the substrate surface.

The substrate of the magnetic recording medium according to the present invention may be of any nonmagnetic plastic material. Typical examples are polyesters such as polyethylene terephthalate (PET) and polyethylene 2,6-naphthalate, polyamides, polyimides, polyphenylene sulfide, polysulfones, all aromatic polyesters, polyether ether ketones, polyether sulfones, and polyether imides. Also, no particular limitation is imposed on the shape, size, and thickness of the substrate as long as they meet the intended application of the medium.

The magnetic recording medium according to the present invention may be provided with any of various known topcoat layers on the magnetic layer, especially the magnetic thin film. It will be understood that the plasma polymerized film previously mentioned can also be used as a topcoat layer. Further, the back surface of the substrate, that is, the free surface of the substrate remote from the magnetic layer may be formed with any of various known backcoat layers.

If desired undercoat may be interposed between the plasma polymerized film and magnetic layer, the magnetic recording medium of the present invention may have two magnetic layers on the opposite major surface of a substrate bearing the plasma polymerized film.

The magnetic recording medium according to the present invention will find applications as video, audio, and computer tapes and disks, and floppy disks, and may also be used as a perpendicular magnetizable medium.

The magnetic recording medium according to the present invention is characterized by markedly improved adherence between a substrate and a magnetic layer, and improved scratch resistance and durability. The magnetic recording medium according to the preferred embodiment of the present invention is characterized by minimized dynamic friction and markedly improved runnability and moving stability. The dynamic friction is little increased after a number of passes, leading to the increased number of permissible repetitive recording/reproducing operations and improved still performance. With improved moving stability, the medium ensures stable operation in widely varying environments from high temperature/high humidity to low temperature/low humidity. Other advantages by the present invention include a reduction in the loss of reproducing output caused by a spacing loss, low noise, and minimized head clogging.

EXAMPLES

Examples of the present invention are given below by way of illustration and not by way of limitation.

Example 1

A substrate in the form of a polyethylene terephthalate (PET) web of 12 um thick was continuously moved through a vacuum chamber in a plasma treating/polymerizing apparatus as shown in FIG. 1 while the vacuum chamber was once evacuated to $10^{-3}$ Torr and then maintained at a gas pressure of 0.1 Torr by passing an Ar carrier gas containing 10% by volume of oxygen ($O_2$) as a treating gas at a flow rate of 50 ml/min. A high frequency voltage at 100 KHz was applied across the electrodes to produce a plasma with which the substrate surface was treated.

Thereafter, a plasma polymerized film was formed on the substrate under the following conditions.

| | Plasma polymerized film | | | |
|---|---|---|---|---|
| | 1 | 2 | 3 | 4 |
| Conditions | | | | |

-continued

| | Plasma polymerized film | | | |
|---|---|---|---|---|
| | 1 | 2 | 3 | 4 |
| Reactant gas | $CH_4$ 100 SCCM | $CH_4$ 50 SCCM $NH_3$ 50 SCCM | $C_2H_2$ 75 SCCM $NO_2$ 25 SCCM | $CH_4$ 250 SCCM |
| Carrier gas, Ar | 50 SCCM | 50 SCCM | 50 SCCM | 50 SCCM |
| Operating pressure | 0.1 Torr | 0.1 Torr | 0.1 Torr | 0.5 Torr |
| Plasma power | 200 W | 200 W | 200 W | 2000 W |
| Plasma frequency | 13.56 MHz | 13.56 MHz | 13.56 MHz | 13.56 MHz |
| Film | | | | |
| Thickness | 30 Å | 25 Å | 40 Å | 200 Å |
| Composition | H/C = ½ | H/C = 3/10 N/C = 8/100 | H/C = 4/10 N/C = 1/10 O/C = 15/100 | H/C = 7/10 |

*SCCM: Standard cubic centimeter per minute

Elemental analysis of these plasma polymerized films was made by SIMS and the thickness measured by an ellipsometer. The following magnetic layers were formed on each of the plasma polymerized films. Maqnetic layer 1 (ML1)

| Ingredients | Parts by weight |
|---|---|
| Co—$\gamma$-$Fe_2O_3$ (particle length 0.4 $\mu$m, width 0.05 $\mu$m, Hc 600 Oe) | 120 |
| Carbon Black | 5 |
| $\alpha$-$Al_2O_3$ (Powder, particle size 0.5 $\mu$m) | 5 |
| Soy lecithin | 3 |
| Solvent, 50/50 MEK (methyl ethyl ketone)/toluene | 100 |

The ingredients were milled in a ball mill for 3 hours to fully wet Co-$\gamma$-$Fe_2O_3$ particles.

A binder composition was separately prepared by thoroughly mixing the following ingredients into a solution.

| Ingredients | Parts by weight |
|---|---|
| (a) Acrylic double bond incorporated saturated polyester resin | 10 (solids) |
| (b) Acrylic double bond incorporated vinyl chloride-binyl acetate copolymer | 10 (solids) |
| (c) Acrylic double bond incorporated polyether urethance elastomer | 10 (solids) |
| (d) Solvent (50/50 MEK/toluene) | 200 |
| (e) Lubricant (higher fatty acid modified silicone oil) | 3 |

The binder composition was admitted into the ball mill containing the magnetic particle mixture and milled for dispersion for a further 42 hours.

The thus obtained magnetic coating composition was applied onto the abovementioned film by gravure coating, subjected to orientation, heated under far-infrared lamps or with hot air to evaporate off the solvent, and then surface smoothened.

The magnetic coating was then cured by exposing it to electron radiation in a mitrogen atmosphere by means of an electron-curtain type radiation accelerator (manufactured by ESI Company) operating at an accelerating voltage of 150 keV and an electrode current of 20 mA to a total dose of 10 Mrad.

Magnetic layer 2 (ML2)

| Ingredients | Parts by weight |
|---|---|
| Fe alloy particles (Particle length 0.3 $\mu$m, width 0.04 $\mu$m, Hc 1100 Oe) | 120 |
| Oleic acid | 2 |
| Solvent, 50/50 MEK/toluene | 100 |

The ingredients were milled in a ball mill for 3 hours to fully wet Fe alloy particles.

A binder composition was separately prepared by thoroughly mixing the following ingredients into a solution.

| Ingredients | Parts by weight |
|---|---|
| (a) Acrylic double bond incorporated butyral resin | 18 (solids) |
| (b) Acrylic double bond incorporated urethane elastomer | 12 (solids) |
| (c) Solvent (50/50 MEK/toluene) | 200 |
| (d) Lubricant (higher fatty acid) | 3 |

The binder composition and the magnetic particle mixture were thoroughly mixed.

The thus obtained magnetic coating composition was applied onto the abovementioned film by gravure coating, subjected to orientation, heated to evaporate off the solvent, and then surface smoothened.

The magnetic coating was then cured by exposing it to electron radiation in a nitrogen atmosphere by means of an electron-curtain type radiation accelerator operating at an accelerating voltage of 150 keV and an electrode current of 20 mA to a total dose of 5 Mrad.

Magnetic layer 3 (ML3)

| Ingredients | Parts by weight |
|---|---|
| $\gamma$-$Fe_2O_3$ (particle length 0.8 $\mu$m, width 0.2 $\mu$m, Hc 300 Oe) | 120 |
| Carbon Black | 5 |
| $\alpha$-$Al_2O_3$ (Powder, particle size 0.5 $\mu$m) | 5 |
| Sorbitan monooleate | 3 |
| Solvent, 50/50 MEK/toluene | 100 |

The ingredients were milled in a ball mill for 3 hours to fully wet $\gamma$-$Fe_2O_3$ particles.

A binder composition was separately prepared by thoroughly mixing the following ingredients into a solution.

| Ingredients | Parts by weight |
|---|---|
| (a) Acrylic double bond incorporated epoxy resin | 15 (solids) |
| (b) Acrylic double bond incorporated | 15 (solids) |

| Ingredients | Parts by weight |
|---|---|
| polybutadiene elastomer | |
| (c) Solvent (50/50 MEK/toluene) | 200 |
| (d) Lubricant (fluoride oil) | 3 |

The binder composition was admitted into the ball mill containing the magnetic particle mixture and milled for dispersion for a further 42 hours.

The thus obtained magnetic coating composition was applied onto the abovementioned film by gravure coating, subjected to orientation, heated to evaporate off the solvent, and then surface smoothened.

The magnetic coating was then cured by exposing it to electron radiation in a nitrogen atmosphere by means of an electron-curtain type radiation accelerator operating at an accelerating voltage of 150 keV and an electrode current of 15 mA to a total dose of 2 Mrad.

Magnetic layer 4 (ML4)

| Ingredients | Parts by weight |
|---|---|
| Fe alloy particles (particle length 0.3 μm, width 0.04 μm, Hc 1100 Oe) | 120 |
| Oleic acid | 2 |
| Solvent, 50/50 MEK/toluene | 100 |

The ingredients were milled in a ball mill for 3 hours to fully wet Fe alloy particles.

A binder composition was rpeapred by thoroughly mixing the following ingredients into a solution.

| Ingredients | Parts by weight |
|---|---|
| (a) Polyvinyl butyral resin (BMS manufactured by Sekisui Kagaku K. K.) | 15 (solids) |
| (b) Urethane (Esten 5715 manufactured by G. F. Goodrich) | 15 (solids) |
| (c) Solvent (MEK) | 200 |
| (d) Higher fatty acid-modified silicone oil | 3 |

After dispersion, 5 parts by weight (calculated as solids content) of an isocyanate compound (Desmodule L manufactured by Beyer) was added to the magnetic coating composition.

The binder composition was admitted into the ball mill containing the magnetic particle mixture and milled for dispersion for a further 42 hours.

The thus obtained magnetic coating composition was applied onto the abovementioned film by gravure coating, subjected to orientation, heated to evaporate off the solvent, and then surface smoothened.

The magnetic coating was then cured by heating at 80° C. for 48 hours.

Magnetic layer 5 (ML5)

| Ingredients | Parts by weight |
|---|---|
| Fe—Co metal particle | 120 |
| α-Al$_2$O$_3$ | 3 |
| Nitrocellulose | 6 |
| Epoxy resin (Epicoat 1004) | 4 |
| Polyurethane (Nipporan 5033) | 10 |
| Solvent | 250 |

The ingredients was milled for dispersion for 5 hours. After dispersion, 5 parts by weight of an isocyanate compound (Colonate L) was added to the magnetic coating composition.

The thus obtained magnetic coating composition was applied onto the abovementioned film by gravure coating, subjected to orientation, heated to evaporate off the solvent, and then surface smoothened, and then the magnetic coating was cured.

Magnetic layer 6 (ML6)

| Ingredients | Parts by weight |
|---|---|
| Ba ferrite (diameter 0.08 μm, thickness 0.008, Hc 800 Oe) | 120 |
| Carbon black (particle size 20 mμm) | 10 |
| α-Al$_2$O$_3$ (powder, particle size 0.5 μm) | 2 |
| Solvent, 50/50 MEK/toluene | 100 |

The ingredients were milled in a ball mill for 3 hours to fully wet Ba ferrite particles.

The binder composition was admitted into the ball mill containing the magnetic particle mixture and milled for dispersion for a further 42 hours.

The thus obtained magnetic coating composition was applied onto the abovementioned film by gravure coating, subjected to perpendicular orientation, heated to evaporate off the solvent, and then surface smoothened.

The magnetic coating was then cured by exposing it to electron radiation in a nitrogen atmosphere by means of an electron-curtain type radiation accelerator operating at an accelerating voltage of 150 keV and an electrode current of 20 mA to a total dose of 5 Mrad.

Standard magnetic tapes were formed by cutting the coated film to the video tape width.

The thus obtained magnetic tape samples were measured for the following properties.

(1) Scratch resistance test

Using a continuous scratch tester, TYPE HEIDON 18 manufactured by Shinto Kagaku K.K. (Japan), the vertical load which scratched a sample was recorded. Scratch resistance was measured before and after the tapes were aged for 7 days at a temperature of 60° C. and a relative humidity of 90%.

The result is expressed as the ratio W/W0 of the scratch vertical load W of a medium sample having a plasma polymerized film to the scratch vertical load W0 of a control medium sample free of a plasma polymerized film. A comparison of such values should be made for the same magnetic layer.

(2) Bond strength (g)

An adhesive tape was attached to the magnetic layer of each tape sample under a predetermined pressure. This adhesive tape was pulled in a direction at an angle of 180° with respect to the original surface at a given rate. The force required to peel off the adhesive tape was measured.

The results are reported in Table 1.

TABLE 1

| Sample No. | Plasma treatment | Plasma polymerized film | | | | Magnetic layer | Scratch resistance | | Bond strength (g) |
|---|---|---|---|---|---|---|---|---|---|
| | | Type | H/C | N/C | O/C | | Before aged | After aged | |
| 101 | — | 1 | 0.5 | — | — | ML1 | 3.5 | 1.8 | 55 |
| 102 | — | 2 | 0.3 | 0.08 | — | ML1 | 4.0 | 3.1 | 60 |
| 103 | — | 3 | 0.4 | 0.1 | 0.15 | ML1 | 3.8 | 3.6 | 55 |
| 104* | — | — | — | — | — | ML1 | 1 | 1 | 20 |
| 105 | — | 4 | 0.7 | — | — | ML1 | 2.2 | 1.2 | 25 |
| 106 | Yes | 1 | 0.5 | — | — | ML1 | 4.0 | 1.9 | 65 |
| 107* | Yes | — | — | — | — | ML1 | 1.5 | 1.1 | 50 |
| 108 | Yes | 1 | 0.5 | — | — | ML2 | 3.0 | 1.5 | 40 |
| 109* | — | — | — | — | — | ML2 | 1 | 1 | 15 |
| 110 | Yes | 1 | 0.5 | — | — | ML3 | 3.2 | 1.6 | 55 |
| 111* | — | — | — | — | — | ML3 | 1 | 1 | 25 |
| 112 | Yes | 1 | 0.5 | — | — | ML4 | 3.2 | 1.7 | 55 |
| 113* | — | — | — | — | — | ML4 | 1 | 1 | 20 |
| 114 | Yes | 1 | 0.5 | — | — | ML5 | 2.1 | 1.5 | 25 |
| 115* | — | — | — | — | — | ML5 | 1 | 1 | 10 |
| 116 | Yes | 1 | 0.5 | — | — | ML6 | 2.9 | 1.6 | 70 |
| 117* | — | — | — | — | — | ML6 | 1 | 1 | 30 |

*Comparison

Example 2

A ferromagnetic metal thin film layer was formed on the substrate of Example 1, more exactly on the plasma polymerized film 1-4 of Example 1 by the following procedure.

Formation of ferromagnetic metal thin film layers

Magnetic thin film 1 (MTF1)

The substrate was moved along a cylindrical cooling can in a vacuum chamber of a standard oblique evaporation apparatus while the vacuum chamber was maintained at a vacuum of $1.0 \times 10^{-4}$ Torr by passing a oxygen/argon (1/1 by volume) mixture at a flow rate of 800 ml/min. A 80 Co/20 Ni alloy was heated and evaporated in the chamber. A fraction of the vapor having an incident angle between 90° and 30° was deposited on the substrate by the oblique evaporation technique, forming a Co-Ni-O thin film having a thickness of 0.15 μm.

Magnetic thin film 2 (MTF2)

Using a Co-Cr alloy having a composition of 80% by weight of Co and 20% by weight of Cr as a source material, a thin film was formed by sputtering to a thickness of 0.2 um. Magnetic thin film 3 (MTF3)

Using the following an activator, an accelerator and an electroless plating bath, a thin film was formed by electroless plating.

| | Parts |
|---|---|
| (1) Activator | |
| Distilled water | 55 |
| Conc. HCl, aqueous solution | 30 |
| PN-PS (manufactured by World Metal K. K.) | 15 |
| 40° C., 1 minute | |
| (2) Accelerator | |
| Distilled water | 80 |
| Conc. HCl aqueous solution | 20 |
| room temperature, 1 minute | |
| (3) Electroless plating bath | |
| Cobalt sulfate | 0.06 mol/l |
| Nickel sulfate | 0.04 mol/l |
| Sodium hypophosphite | |
| Roschelle salt | 0.5 mol/l |
| Boric acid | 0.2 mol/l |
| Ammonium sulfate | 0.5 mol/l |
| Alkalinized with NaOH to pH 9.5 | |
| 70° C., 2 minutes | |

The obtained thin film has a thickness of 0.15 μm, and contains Co and Ni (Co/Ni=6/4). The thus obtained webs were cut to the standard width of ½ inch, obtaining video tape samples.

The samples were measured for the following properties.

(1) Scratch resistance test aforementioned in Example 1

(2) Output reduction

A commercial VHS video deck was loaded and operated with a tape at a temperature of 20° C. and a relative humidity of 60%. A reduction (dB) in output after 200 passes was determined.

The results are reported in Table 2.

TABLE 2

| Sample No. | Plasma treatment | Plasma polymerized film | | | | Magnetic thin film | Output reduction (dB) | Scratch resistance | |
|---|---|---|---|---|---|---|---|---|---|
| | | Type | H/C | N/C | O/C | | | Before aged | After aged |
| 201 | — | 1 | 0.5 | 0 | 0 | MTF1 | −0.3 | 2.2 | 1.6 |
| 202 | — | 2 | 0.3 | 0.08 | 0 | MTF1 | −0.2 | 2.0 | 2.2 |
| 203 | — | 3 | 0.4 | 0.1 | 0.15 | MTF1 | −0.2 | 2.5 | 2.6 |
| 204* | — | — | — | — | — | MTF1 | −7 | 1 | 1 |
| 205 | — | 4 | 0.7 | 0 | 0 | MTF1 | −10 | 1.9 | 1.3 |
| 206 | Yes | 1 | 0.5 | 0 | 0 | MTF1 | −0.2 | 2.5 | 1.8 |
| 207* | Yes | — | — | — | — | MTF1 | −1 | 1.2 | 1.1 |
| 208 | Yes | 1 | 0.5 | 0 | 0 | MTF2 | −0.2 | 1.8 | 1.4 |
| 209* | — | — | — | — | — | MTF2 | −2 | 1 | 1 |
| 210 | — | 1 | 0.5 | 0 | 0 | MTF3 | −0.8 | 1.5 | 1.3 |

TABLE 2-continued

| Sample No. | Plasma treatment | Plasma polymerized film | | | | Magnetic thin film | Output reduction (dB) | Scratch resistance | |
|---|---|---|---|---|---|---|---|---|---|
| | | Type | H/C | N/C | O/C | | | Before aged | After aged |
| 211* | — | — | — | — | — | MTF3 | −5 | 1 | 1 |

*Comparison

Example 3

The surface of the substrate of Example 1 was plasma-treated under the same conditions as in Example 1.

Thereafter, plasma polymerized films 1-3 of Example 1 were formed on the substrate under the same conditions as in Example 1.

Colloidal silica was applied to each of the plasma polymerized films by coating, obtaining the substrate having fine protrusions distributed thereon. A ferromagnetic metal thin film layers MTF1, 2 of Example 2 were formed on the substrate, more exactly on the plasma polymerized films having protrusions by the same procedure as in Example 2.

The thus obtained webs were cut to the standard width of 1/2 inch, obtaining video tape samples.

For the samples of the present invention, no substantial effect of colloidal silica applied was observable under an optical microscope or measureable by a probe type surface roughness meter, but the presence of protrusions on the magnetic thin film surface could be observed under a scanning electron microscope with a high magnifying power and their size measured and found to correspond to colloidal silica particles.

The samples were measured for the following properties.

(1) Scratch resistance test aforementioned in Example 1

(2) Still performance

Using a commercial video deck, signals at 5 MHz were recorded in a sample and reproduced in the still mode to determine the time until the reproduced output level reduced to 90% of the initial.

The results are reported in Table 3 together with the height and density of protrusions on the magnetic thin film surface.

consists essentially of carbon or consists essentially of at least 30 atomic % of carbon and an element selected from hydrogen, nitrogen, oxygen, or mixtures thereof, and has a thickness of 5 to 80 Å.

2. The magnetic recording medium of claim 1, wherein the plasma polymerized film consists essentially of carbon, and an element selected from hydrogen, nitrogen, oxygen, or mixtures thereof.

3. The magnetic recording medium of claim 2, wherein carbon, hyrogen, nitrogen and oxygen are contained in such amounts that the atomic ratio of hydrogen to carbon is from 1/6 to 1, the atomic ratio of nitrogen to carbon is up to 3/10 and the atomic ratio of oxygen to carbon is up to 3/10.

4. The magnetic recording medium of claim 1 wherein the substrate itself is plasma treated with an inorganic gas.

5. The magnetic recording medium of claim 1 wherein the magnetic layer comprises a particulate magnetic material and a binder.

6. The magnetic recording medium of claim 1 wherein the magnetic layer is a ferromagnetic metal thin film.

7. The magnetic recording medium of claim 6 wherein the ferromagnetic metal thin film layer is formed by a vapor or liquid phase plating process.

8. The magnetic recording medium of claim 6 wherein the ferromagnetic metal thin film layer has a layer of ferromagnetic metal oxide at its surface.

9. The magnetic recording medium of claim 6 wherein the ferromagnetic metal thin film layer is comprised of cobalt and oxygen, or cobalt and oxygen and at least one element selected from nickel and chromium.

10. The magnetic recording medium of claim 6 wherein the medium has on average at least 105 protrusions per square millimeter of the medium surface, the

TABLE 3

| Sample No. | Plasma polymerized film | | | | Magnetic thin film | Protrusion | | Scratch resistance | | Still performance (min.) |
|---|---|---|---|---|---|---|---|---|---|---|
| | Type | H/C | N/C | O/C | | Height (Å) | Density (/mm²) | Before aged | After aged | |
| 301 | 1 | 0.5 | 0 | 0 | MTF1 | 50 | $5 \times 10^6$ | 2.5 | 1.7 | 16 |
| 302 | 1 | 0.5 | 0 | 0 | MTF1 | 1000 | $5 \times 10^6$ | 1.3 | 1.1 | 13 |
| 303 | 1 | 0.5 | 0 | 0 | MTF1 | 100 | $1 \times 10^7$ | 2.3 | 1.7 | 19 |
| 304 | 1 | 0.5 | 0 | 0 | MTF1 | 200 | $5 \times 10^7$ | 2.2 | 1.6 | 20 |
| 305* | — | — | — | — | MTF1 | 200 | $5 \times 10^7$ | 1.2 | 1.0 | 6 |
| 306 | 1 | 0.5 | 0 | 0 | MTF1 | 250 | $3 \times 10^7$ | 2.0 | 1.5 | 18 |
| 307 | 1 | 0.5 | 0 | 0 | MTF1 | — | — | 2.2 | 1.3 | 10 |
| 308 | 2 | 0.3 | 0.08 | 0 | MTF1 | 100 | $3 \times 10^7$ | 2.6 | 2.7 | 21 |
| 309 | 3 | 0.4 | 0.1 | 0.15 | MTF1 | 100 | $3 \times 10^7$ | 3.3 | 2.9 | 24 |
| 310* | — | — | — | — | MTF1 | — | — | 1 | 1 | 2 |
| 311 | 2 | 0.3 | 0.08 | 0 | MTF2 | 200 | $3 \times 10^7$ | 2.6 | 2.2 | 40 |
| 312 | 2 | 0.3 | 0.08 | 0 | MTF2 | 500 | $3 \times 10^7$ | 1.9 | 1.4 | 15 |
| 313 | 2 | 0.3 | 0.08 | 0 | MTF2 | 100 | $1 \times 10^4$ | 1.8 | 1.3 | 15 |
| 314* | — | — | — | — | MTF2 | — | — | 1 | 1 | 10 |

*Comparison

We claim:

1. In a magnetic recording medium comprising a substrate, a plasma polymerized film on said substrate, and a magnetic layer on said plasma polymerized film, the improvement wherein the plasma polymerized film protrusions having a of 30 to 300 Å.

11. The magnetic recording medium of claim 10 wherein the number of protrusions is $10^6$ to $10^9$ per square millimeter of the medium surface.

* * * * *

UNITED STATES PATENT AND TRADEMARK OFFICE
CERTIFICATE OF CORRECTION

PATENT NO. : 4,780,354

DATED : Oct. 25, 1988

INVENTOR(S) : Masatoshi NAKAYAMA

It is certified that error appears in the above-identified patent and that said Letters Patent is hereby corrected as shown below:

| Col. | Line | |
|------|------|---|
| 28 | 43, | Delete "105" and insert --$10^5$--, |
| 28 | 63, | Insert --height-- between "a" and "of" |

Signed and Sealed this

Fourteenth Day of March, 1989

Attest:

DONALD J. QUIGG

Attesting Officer

Commissioner of Patents and Trademarks